United States Patent
Miyakawa et al.

(10) Patent No.: US 12,528,537 B2
(45) Date of Patent: Jan. 20, 2026

(54) STEERING SYSTEM FOR VEHICLE

(71) Applicants: HONDA MOTOR CO., LTD., Tokyo (JP); THYSSENKRUPP PRESTA AKTIENGESELLSCHAFT, Eschen (LI)

(72) Inventors: Hayato Miyakawa, Tokyo (JP); Munetsugu Hanji, Tokyo (JP); Yoshinobu Watanabe, Tokyo (JP); Satoshi Nakahara, Tokyo (JP); Ryo Kato, Tokyo (JP); Laszlo Dombai, Erd (HU); David Kulcsar, Lajosmizse (HU); Peter Kakas, Budapest (HU)

(73) Assignees: HONDA MOTOR CO., LTD., Tokyo (JP); THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 453 days.

(21) Appl. No.: 18/002,568

(22) PCT Filed: Mar. 30, 2021

(86) PCT No.: PCT/JP2021/013632
§ 371 (c)(1),
(2) Date: Dec. 20, 2022

(87) PCT Pub. No.: WO2022/208680
PCT Pub. Date: Oct. 6, 2022

(65) Prior Publication Data
US 2023/0234637 A1    Jul. 27, 2023

(51) Int. Cl.
*B62D 6/00* (2006.01)
*B62D 5/00* (2006.01)
(Continued)

(52) U.S. Cl.
CPC ............... *B62D 6/00* (2013.01); *B62D 5/006* (2013.01); *B62D 5/046* (2013.01); *B62D 15/0245* (2013.01)

(58) Field of Classification Search
CPC .......... B62D 6/00; B62D 5/006; B62D 5/046; B62D 15/0245; B62D 6/002; B62D 6/008; B62D 5/0457
See application file for complete search history.

(56) References Cited

U.S. PATENT DOCUMENTS 6,097,286 A * 8/2000 Discenzo ............... B62D 6/008
                                                    340/576
6,691,009 B1 * 2/2004 Yao ........................ B62D 6/008
                                                    701/41
(Continued)

FOREIGN PATENT DOCUMENTS

CN     109963766 A    7/2019
JP     2010264942 A   11/2010
(Continued)

OTHER PUBLICATIONS

PCT International Search Report for Patent Application PCT/JP2021/013632 mailed Dec. 22, 2021; 3 pp.
(Continued)

*Primary Examiner* — Minnah L Seoh
(74) *Attorney, Agent, or Firm* — Armstrong Teasdale LLP (57) ABSTRACT

A steering system is provided with a control unit (15) configured to determine a target steered angle ($\alpha t$) according to a steering angle ($\beta$) of a steering shaft (18) which is fitted with a steering wheel (19) and drive a steering actuator so as to cause the steered angle ($\alpha$) to coincide with the target steered angle, and to determine a target reaction force (Tt) according to a steered state of the wheels and drive a reaction force actuator (13) so as to cause the reaction force to coincide with the target reaction force. The control unit is (Continued)

configured to correct an output of the steering angle sensor in such a manner that a geometric steering center of the steering wheel coincides with a mechanical steering center of the steering shaft upon receiving a prescribed input (S) from a manual input switch (37).

16 Claims, 7 Drawing Sheets

(51) Int. Cl.
    *B62D 5/04*     (2006.01)
    *B62D 15/02*     (2006.01)

(56) References Cited

U.S. PATENT DOCUMENTS

| | | | |
|---|---|---|---|
| 9,751,557 B2 * | 9/2017 | Svensson | B62D 6/008 |
| 11,192,581 B2 | 12/2021 | Polmans | |
| 2003/0141135 A1 * | 7/2003 | Menjak | B62D 5/006 |
| | | | 180/402 |
| 2004/0061500 A1 * | 4/2004 | Lou | B62D 15/0245 |
| | | | 324/332 |
| 2005/0284245 A1 * | 12/2005 | Chen | B62D 5/0457 |
| | | | 74/388 PS |
| 2006/0090954 A1 | 5/2006 | Sugitani et al. | |
| 2006/0293818 A1 * | 12/2006 | Lu | B62D 15/0235 |
| | | | 701/41 |
| 2008/0277188 A1 * | 11/2008 | Hauser | B62D 11/04 |
| | | | 180/422 |
| 2009/0037054 A1 | 2/2009 | Igarashi et al. | |
| 2015/0353079 A1 | 12/2015 | Suzuki | |
| 2017/0305455 A1 | 10/2017 | Hisanaga et al. | |
| 2019/0367079 A1 | 12/2019 | Kodera | |
| 2020/0180685 A1 | 6/2020 | Suzuki et al. | |
| 2020/0307681 A1 | 10/2020 | Kakimoto et al. | |
| 2021/0024122 A1 | 1/2021 | Walentowski | |
| 2021/0031831 A1 | 2/2021 | Yoshizaki et al. | |
| 2022/0089212 A1 * | 3/2022 | Klein | B62D 5/0463 |
| 2022/0185359 A1 * | 6/2022 | Wilson-Jones | B62D 1/181 |

FOREIGN PATENT DOCUMENTS

| | | |
|---|---|---|
| JP | 2019209789 A | 12/2019 |
| JP | 2020092583 A | 6/2020 |
| JP | 2020163989 A | 10/2020 |
| WO | 2014049939 A1 | 4/2014 |
| WO | 2014108968 A1 | 7/2014 |

OTHER PUBLICATIONS

First Office Action for Chinese Patent Application No. 202180045183.7 dated Jul. 2, 2025; pp.

Notice of Reasons for Refusal for Japanese Patent Application No. 2022-521097 dated Jun. 20, 2023; 6 pp.

* cited by examiner

STEERING SYSTEM FOR VEHICLE

CROSS-REFERENCE TO RELATED APPLICATION

This application is a U.S. National Phase Application of PCT/JP2021/013632, filed on Mar. 30, 2021. The content of this application is hereby expressly incorporated by reference in its entirety.

TECHNICAL FIELD

The present invention relates to a steer-by-wire steering system for a vehicle.

BACKGROUND ART

Known is a steer-by-wire steering system for a vehicle which includes a steering input mechanism such as a steering wheel configured to be operated by a vehicle operator, and a steering mechanism mechanically separated from the steering input mechanism and configured to change the steered angle of the wheels. The steering mechanism is driven by a steering actuator that generates a driving force to change the steering angle of the wheels. A reaction force actuator applies a reaction force to the steering input mechanism in response to the steering operation.

In regard to such a steer-by-wire steering system, a prior invention provides an improvement in the work efficiency in assembling a switch assembly including a steering angle sensor and a steering wheel to a steering shaft assembly (Patent Document 1). According to this prior invention, the steering shaft assembly is provided with a shaft positioning mechanism that positions and fixes the steering shaft to the housing in a rotationally fast manner. Further, the switch assembly is provided with a collar positioning mechanism for positioning and fixing a pusher collar to the casing in a rotationally fast manner,

PRIOR ART DOCUMENT(S)

Patent Document(s)

Patent Document 1: JP2010-264942A

SUMMARY OF INVENTION

Task to be Accomplished by the Invention

However, in the prior invention disclosed in Patent Document 1, since the shaft positioning mechanism and the collar positioning mechanism are required, the structure of the operating device becomes complicated, and the system is undesirably large in size and costly.

In view of such a problem of the prior art, a primary object of the present invention is to improve work efficiency when assembling a steering system without causing an increase in size or cost of the system.

Means to Accomplish the Task

To achieve such an object, the present invention provides a steering system (1) for a vehicle (2), comprising: a steering wheel (19) configured to be operated by a driver; a steering shaft (18) connected to the steering wheel in a rotational movement transmitting manner; a steering mechanism (11) mechanically separated from the steering shaft, and configured to steer wheels (3) of the vehicle; a steering angle sensor (21) that detects a steering angle ($\beta$) about a control steering center ($\beta=0$) given as an angular position of the steering shaft corresponding to a straight traveling state of the vehicle; a steering actuator (12) that provides a driving force to the steering mechanism; a steered angle sensor (32) that detects the steered angle ($\alpha$) of the wheels; a reaction force actuator (13) that applies a reaction force (T) to the steering wheel in response to a steering operation; and a control unit (15) configured to determine a target steered angle ($\alpha t$) according to the steering angle ($\beta$) and drive the steering actuator so as to cause the steered angle ($\alpha$) to coincide with the target steered angle, and to determine a target reaction force (Tt) according to a steered state of the wheels and drive the reaction force actuator so as to cause the reaction force to coincide with the target reaction force, wherein the control unit is configured to correct an output of the steering angle sensor in such a manner that the current steering angle corresponds to the control steering center when a prescribed input is received.

According to this arrangement, even when the steering wheel is assembled to the steering shaft with the geometric center of the steering wheel angularly deviated from the control steering center of the steering shaft, the output of the steering angle sensor can be corrected so that the steering angle (geometric steering center) at the time point of assembly corresponds to the control steering center by forwarding a prescribed input from the manual input switch to the control unit with the steering wheel positioned at the geometric steering center. In other words, even if an angular error should occur when assembling the steering wheel, the current steering angle (as determined by the angular position of the steering shaft) can be reset as the control steering center without the need for reassembling the steering wheel. Therefore, the work efficiency in assembling the steering system is improved. Further, since no physical positioning mechanism is required for the steering system, an increase in size and cost of the steering system can be avoided.

Preferably, the control unit is configured to correct the output of the steering angle sensor when a predetermined time period has elapsed from a time point when the prescribed input is received, and temporarily stop driving the reaction force actuator until the predetermined time period has elapsed from the time point when the prescribed input is received.

Alternatively, the control unit may be configured to correct the output of the steering angle sensor when a predetermined time period has elapsed from a time point when the prescribed input is received, and temporarily reduce the target reaction force until the predetermined time period has elapsed from the time point when the prescribed input is received.

Alternatively, the control unit may be configured to correct the output of the steering angle sensor when a predetermined time period has elapsed from a time point when the prescribed input is received, and provide a dead zone in the deviation until the predetermined time period has elapsed from the time point when the prescribed input is received.

According to these arrangements, during the calibration of the control steering center, the steering wheel is prevented from being turned by the reaction force actuator which may turn the steering wheel according to the steered state of the wheels under the control of the control unit. Thereby, the worker is enabled to properly correct the output of the steering angle sensor without being hampered by the reaction force so that the geometrical steering center of the steering wheel coincides with the control steering center of the steering shaft.

Preferably, the steering system further comprises a physical stopper (43) that defines a physical maximum steering angle ($\beta mP$) of the steering shaft in each rotational direction from the control steering center, and the control unit is configured to define a control maximum steering angle ($\beta mC$) of the steering wheel in each rotational direction from the control steering center, the control maximum steering angle being smaller than the physical maximum steering angle, and drive the reaction force actuator so as to generate a steering limit reaction force (Ts1) that defines the control maximum steering angle.

According to this arrangement, the rotation of the steering shaft is regulated by the physical stopper so that problems such as damaging wire harness by excessive rotation of the steering shaft can be avoided. Further, the control unit generates a steering limit reaction force to prevent the steering shaft from colliding with the physical stopper. As a result, the generation of collision noise and impact due to collision can be avoided. Since the maximum control angle of the steering wheel is set evenly each rotational direction from the control steering center, the maximum steering angle can be maintained to be even in both rotational directions.

In the arrangement in which the control unit sets the control maximum steering angle, preferably, the control unit prohibits correction of the output of the steering angle sensor when the prescribed input is received with the steering wheel set to a geometrical steering center thereof, and it is determined that the control maximum steering angle will exceed the physical maximum steering angle.

When the maximum control angle exceeds the maximum physical steering angle, the maximum steering angle in one rotational direction becomes smaller than the maximum steering angle in the other rotational direction, so that the maximum steering angle becomes uneven between the two rotational direction. In such a case, the control unit prohibits the correction of the output of the steering angle sensor so that the maximum steering angle is prevented from becoming uneven in the two rotational directions.

In the arrangement in which the control unit sets the control maximum steering angle, preferably, the control unit corrects the output of the steering angle sensor so that the current steering angle is brought closer to the control steering center as much as possible without causing the control maximum steering angle to exceed the physical maximum steering angle when the prescribed input is received with the steering wheel set to a geometrical steering center thereof, and it is determined that the control maximum steering angle will exceed the physical maximum steering angle.

According to this arrangement, the geometrical steering center of the steering wheel can be brought as close to the control steering center of the steering wheel as possible without causing the control maximum steering angle to exceed the physical maximum steering angle.

In the arrangement in which the control unit sets the control maximum steering angle, preferably, the control unit corrects the output of the steering angle sensor so that a geometrical steering center of the steering wheel coincides with the control steering center of the steering shaft, and change a ratio (K) of the steering angle to the steered angle to a smaller value so that the control maximum steering angle does not exceed the physical maximum steering angle when the prescribed input is received with the steering wheel set to the geometrical steering center, and it is determined that the control maximum steering angle will exceed the physical maximum steering angle.

Thus, the output of the steering angle sensor is corrected so that the geometrical steering center of the steering wheel coincides with the mechanical steering sensor of the steering shaft. By changing the ratio of the steering angle to the steered angle in such a manner that the control maximum steering angle does not exceed the physical maximum steering angle, the maximum available steered angle of the wheels can be ensured, and the maximum physical steering angle is prevented from becoming uneven in the two rotational directions.

Preferably, the steering system further includes a control steering center setting switch (37) provided in the vehicle for generating the prescribed input.

According to this arrangement, the worker or the operator can easily correct the output of the steering angle sensor by operating the control steering center setting switch.

Alternatively, the prescribed input may be an input from a vehicle diagnosis device (39) detachably connected to the vehicle.

According to this arrangement, the user or the driver is prevented from accidentally correcting the output of the steering angle sensor while the vehicle is traveling.

Effect of the Invention

The present invention thus improves work efficiency when assembling a steering system without causing an increase in size or cost of the system.

DESCRIPTION OF THE PREFERRED EMBODIMENT(S)

Figure 1:
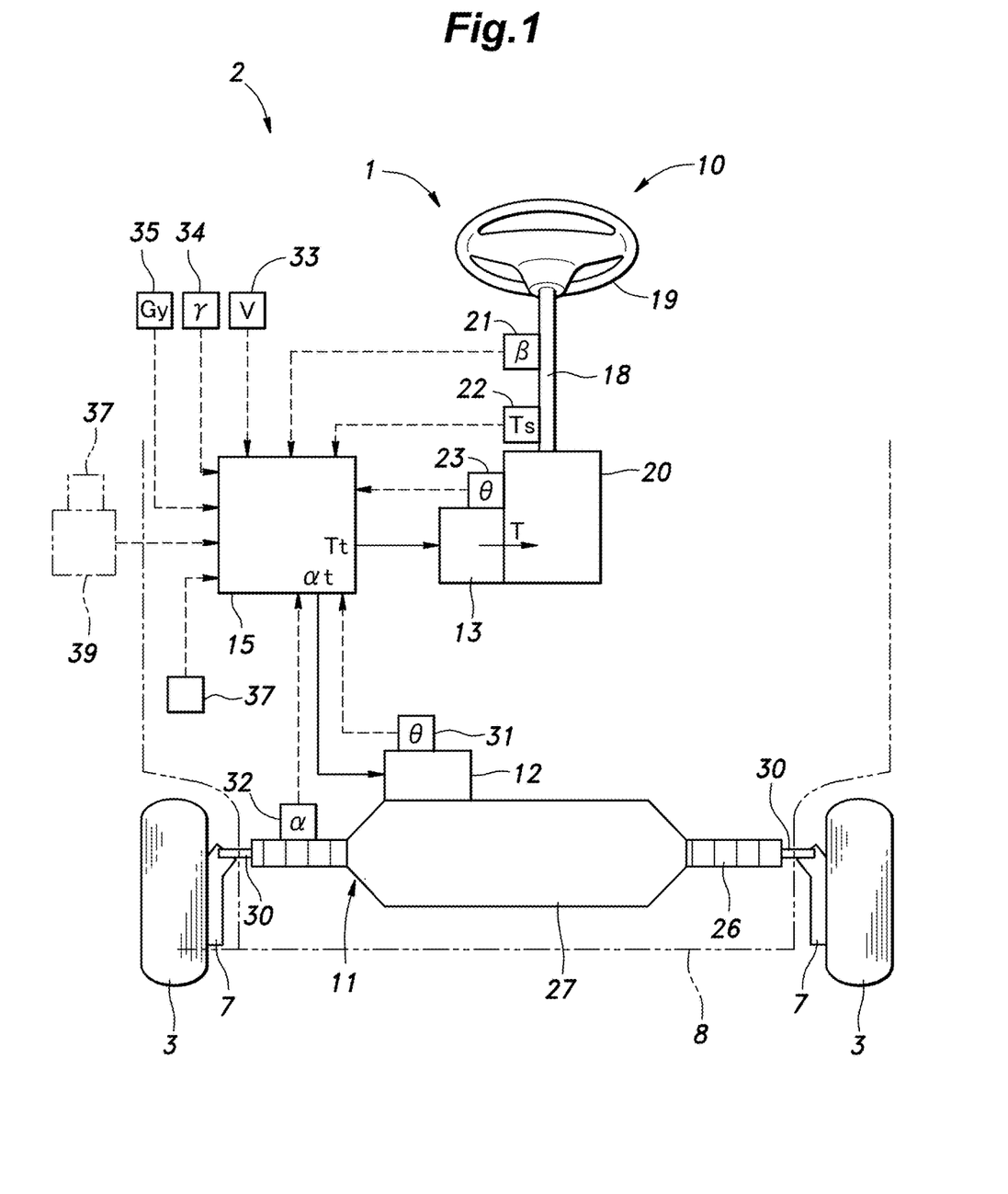
FIG. 1 is a schematic diagram of a steering system according to an embodiment of the present invention.

A steering system 1 for a vehicle 2 according an embodiment of the present invention is described in the following. As shown in FIG. 1, the steering system 1 consists of a steer-by-wire (SBW) steering system. The vehicle 2 fitted with the steering system 1 is a four-wheeled vehicle having left and right front wheels 3 and left and right rear wheels (not shown in the drawings). The left and right front wheels 3 are supported by a vehicle body 8 (only the outline of a lower part thereof is shown in FIG. 1) via respective knuckles 7 so that the steered angle α of the front wheels 3 can be changed, and the front wheels 3 thus serve as steerable wheels. The steered angle α refers to the angle of the front wheels 3 with respect to the fore and aft direction in plan view. The steering system 1 thus changes the steered angle α of the front wheels 3.

The steering system 1 includes a steering input mechanism 10 rotatably provided on the vehicle body 8, a steering mechanism 11 for steering the front wheels 3, a steering actuator 12 for applying a driving force to the steering mechanism 11, a reaction force actuator 13 that applies a reaction torque T to the steering input mechanism 10, and a control unit 15 that controls the reaction force actuator 13 and the steering actuator 12. The steering system 1 may be a redundant system that includes a plurality of sets each individually provided with a steering actuator 12, a reaction force actuator 13, and a control unit 15.

The steering input mechanism 10 accepts a steering operation by the vehicle operator. The steering input mechanism 10 includes a steering shaft 18 rotatably supported by the vehicle body 8 and a steering wheel 19 provided at an end of the steering shaft 18. The steering shaft 18 is rotatably supported by a steering column 20 provided on the vehicle body 8, and has a rear end thereof projecting rearward from the steering column 20. The steering wheel 19 is connected to the rear end of the steering shaft 18 so as to rotate integrally with the steering shaft 18. Thus, the steering shaft 18 is connected to the steering wheel 19 so as to transmit a rotational movement of the steering wheel 19 to the steering shaft 18.

The reaction force actuator 13 consists of an electric motor which is connected to the steering shaft 18 via a gear mechanism. When the reaction force actuator 13 is driven, the driving force is transmitted to the steering shaft 18 as a rotational force. The reaction force actuator 13 applies a rotational torque to the steering input mechanism 10. The torque applied to the steering input mechanism 10 by the reaction force actuator 13 in response to the steering operation is called a reaction torque T.

The steering system 1 is further provided with a steering angle sensor 21 that detects the rotational angle of the steering shaft 18 around the central axis thereof as a steering angle β. The steering angle is given as a rotational angle of the steering shaft 18 relative to a prescribed control steering center (which coincides with a mechanical steering center of the steering mechanism except for special cases which will be discussed hereinafter). The steering angle sensor 21 may be a per se known rotary encoder. Further, the steering system 1 is provided with a torque sensor 22 that detects the torque applied to the steering shaft 18 as a steering torque Ts. The torque sensor 22 detects the steering torque Ts applied to a part of the steering shaft 18 located between the steering wheel 19 and the reaction force actuator 13. The steering torque Ts is determined by the operating torque applied to the steering wheel 19 by the vehicle operator and the reaction torque T applied to the steering shaft 18 by the reaction force actuator 13. The torque sensor 22 may consist of a per se known torque sensor such as a magnetostrictive torque sensor or a strain gauge, or, alternatively, the steering torque may be estimated from the value of the electric current flowing through the electric motor of the reaction force actuator 13.

The steering system 1 further includes a first rotational angle sensor 23 that detects the rotational angle θ of the reaction force actuator 13. The first rotational angle sensor 23 may be a per se known resolver or rotary encoder.

The steering mechanism 11 has a rack 26 extending in the vehicle lateral direction. The rack 26 is supported by a gear housing 27 so as to be movable in the vehicle lateral direction. The left and right ends of the rack 26 are respectively connected to knuckles 7 that support the left and right front wheels 3 via respective tie rods 30. As the rack 26 moves in the vehicle lateral direction, the steered angle α of the front wheels 3 changes. The steering mechanism 11 is mechanically separated from the steering input mechanism 10.

The steering actuator 12 consists of an electric motor. The steering actuator 12 moves the rack 26 in the vehicle lateral direction according to the signal from the control unit 15, and changes the steered angle α of the left and right front wheels 3 accordingly. The steering actuator 12 is incorporated with a variable ratio mechanism that allows the ratio K of the steering angle β to the steered angle α to be varied (K=β/α). Therefore, the steered angle α of the front wheels 3 could change while the steering angle β is kept fixed.

The steering system 1 is further provided with a second rotational angle sensor 31 that detects the rotational angle θ of the steering actuator 12. The second rotational angle sensor 31 may be a per se known resolver or rotary encoder. Further, the steering system 1 has a steered angle sensor 32 that detects the steered angle α of the front wheels 3. In the present embodiment, the steered angle sensor 32 consists of a rack stroke sensor that detects the rack position (the position of the rack 26 along the lateral direction of the vehicle), and the steered angle α of the front wheels 3 is determined from the rack position.

The control unit 15 consists of an electronic control unit including a CPU, memory, a storage device for storing a program, and the like. The steering angle sensor 21, the torque sensor 22, the first rotational angle sensor 23, the second rotational angle sensor 31, and the steered angle sensor 32 are connected to the control unit 15. Based on the signals from these sensors, the control unit 15 acquires signals corresponding to the steering angle β, the steering torque Ts, the rotational angle θ of the reaction force actuator 13, the rotational angle θ of the steering actuator 12, and the steered angle α. Further, the control unit 15 is connected to a vehicle speed sensor 33, a yaw rate sensor 34, and a lateral acceleration sensor 35, and acquires signals corresponding to the vehicle speed V, the yaw rate y, and the lateral acceleration Gy.

The control unit 15 is connected to the reaction force actuator 13 and the steering actuator 12 to control the reaction force actuator 13 and the steering actuator 12. The control unit 15 controls the steering actuator 12 according to the steering angle β, and controls the reaction force actuator 13 according to the steered angle α.

A mode of control action of the control unit 15 in the SBW mode is discussed in the following. The control unit 15 computes the target steered angle at according to the steering angle β detected by the steering angle sensor 21. The control unit 15 may compute the target steered angle αt by, for example, dividing the steering angle β by the gear ratio K (αt=B/K). The gear ratio K may be preferably 2 to 30, and may be more preferably 8. The control unit 15 computes a first current value A1 to be supplied to the steering actuator 12 according to the deviation Δα (=αt−α) between the target steered angle αt and the actual steered angle α so that the steered angle α coincides with the target steered angle αt. Thus, the control unit 15 performs a feedback control of the steering actuator 12 according to the deviation Δα. With an increasing deviation Δα, the first current value A1 supplied to the steering actuator 12 is increased, the output of the steering actuator 12 is increased, and the amount of change in the steered angle α is increased.

The control unit 15 computes the target reaction torque Tt to be generated in the reaction force actuator 13 according to the steered state of the front wheels 3 in particular according to the deviation Δα. The target reaction torque Tt may be computed by multiplying Δα by a predetermined coefficient. Then, the control unit 15 computes a second current value A2 to be supplied to the reaction force actuator 13 according to the computed target reaction torque Tt. The second current value A2 to be supplied to the reaction force actuator 13 may be determined in relation with the target reaction torque Tt by referring to a predetermined map. Alternatively, the control unit 15 may determine the second current value A2 according to the deviation Δα by referring to a predetermined map. The target reaction torque Tt and the second current value A2 are each greater in value as the deviation Δα of the steered angle α increases.

The control unit 15 supplies the second current value A2 to the reaction force actuator 13, and generates a corresponding driving force in the reaction force actuator 13. The driving force generated by the reaction force actuator 13 is applied to the steering shaft 18 as a reaction torque T that opposes the operation input of the vehicle operator. As a result, the vehicle operator can receive a reaction force (resistance force) against the steering operation applied to the steering wheel 19.

The vehicle 2 is provided with a control steering center setting switch 37 as a manual input switch for transmitting a steering center setting signal S to the control unit 15. The control steering center setting switch 37 is configured to accept a manual input, and to generate a steering center setting signal S when the manual input is received. As shown by the imaginary line in FIG. 1, alternatively, the control steering center setting switch 37 may be provided in a vehicle diagnosis device 39 which is provided separately from the vehicle 2, and can be selectively connected to the control unit 15.

Figure 2:
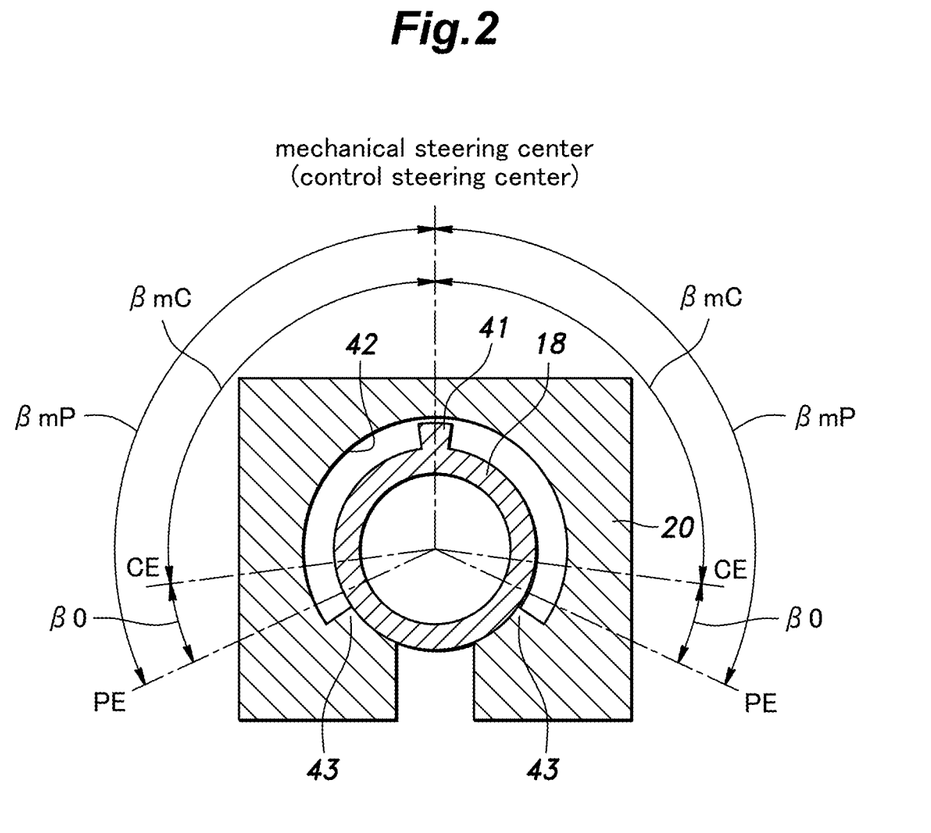
FIG. 2 is a simplified cross sectional view of a steering input mechanism.

FIG. 2 is a schematic cross-sectional view of the steering input mechanism 10. As described above, the steering shaft 18 is rotatably supported by the steering column 20. As shown in FIG. 2, a protrusion 41 is formed on the outer surface of the steering shaft 18, and a receiving groove 42 for receiving the protrusion 41 is formed on the steering column 20. The receiving groove 42 is formed on the inner periphery of the steering column 20 over an angular range smaller than 360 degrees, and the end walls defining the respective ends of the receiving groove 42 form physical stoppers 43 that limit the movement of the protrusion 41.

When the steering wheel 19 is turned clockwise, the protrusion 41 eventually comes into contact with the physical stopper 43 on the right side. The angular position where the protrusion 41 abuts on the physical stopper 43 on the right side is the physical end PE on the right side of the steering shaft 18. When the steering wheel 19 is turned counterclockwise, the protrusion 41 eventually comes into contact with the physical stopper 43 on the left side. The angular position where the protrusion 41 abuts on the physical stopper 43 on the left side is the physical end PE on the left side of the steering shaft 18. The center between the physical end PE on the right side and the physical end PE on the left side is the mechanical steering center of the steering shaft 18. The angular range from the mechanical steering center of the steering shaft 18 to the physical end PE on the right side is the physical maximum steering angle βmP on the right side, and the angular range from the mechanical steering center of the steering shaft 18 to the physical end PE on the left side is the physical maximum steering angle βmP on the left side. Thus, the left and right physical stoppers 43 each define the left or the right physical maximum steering angle βmP of the steering shaft 18.

The geometric angular center of the steering wheel 19, or the neutral position of the steering input mechanism 10 as perceived by the driver, usually coincides with the mechanical steering center of the steering shaft 18. When the steering shaft 18 is turned to the physical end PE, an impact noise is generated, and the impact may impair the mechanical durability of the steering input mechanism 10. It is therefore desirable to avoid such noise and the impairment of durability.

Similar physical limits are also provided on the front wheels 3, especially in the steering mechanism 11. The front wheels 3 can be steered only up to the physical end PE in each direction. The physical end PE can be defined in various ways, but is usually defined by the stroke end of the rack 26, commonly referred to as the "rack end". The center between the left and right stroke ends of the rack 26 is the mechanical steering center of the steering mechanism 11 which usually coincides with the position of the front wheels 3 when the vehicle is traveling straight, or when the steered angle α of the steering mechanism 11 is 0°. The ratio K (=B/α) of the steering angle β to the steered angle α is set so that the physical end PE of the steering shaft 18 corresponds to the physical end PE of the rack 26. When the front wheels 3 are steered to the rack end, an impact noise is generated and the mechanical durability of the steering mechanism 11 may be impaired due to the impact. It is desirable to avoid such noise and impairment of durability.

In the present embodiment, a control end CE, which is the control rotation limit of the steering shaft 18, is set for each rotational direction at an angle smaller than the angle of the physical end PE by an angle β0. The control steering center (angular position of steering angle β=0) of the steering input mechanism 10 corresponds to the rotational angle of the steering shaft that causes the steered angle α of the front wheels 3 to be substantially zero, and the vehicle 2 travels straight. Ideally, the control steering center should correspond to the geometric steering center of the steering wheel 19. The angular range from the control steering center of the steering shaft 18 to the control end CE on the right side is defined as the control maximum steering angle βmC on the right side, and the angular range from the control steering center of the steering shaft 18 to the control end CE on the left side is defined as the control maximum steering angle βmC on the left side. The target steered angle αt is related to the steering angle β in such a manner that the steered angle α of the front wheels 3 increases as the steering angle β increases. However, when the steering angle β increases beyond the control end CE, the command to the steering actuator 12 is limited to the control maximum steering angle corresponding to the control maximum steering angle βmC. In other words, when the steering input mechanism 10 is turned beyond the maximum control steering angle βmC, the front wheels 3 are steered only up to the maximum control steered angle. The maximum control steered angle is smaller than the maximum physical steered angle.

The reaction torque T that is applied to the steering input mechanism 10 is normally controlled so as to increase independence on the deviation Δα in the steered angle α from the target steered angle αt. However, when the steering angle β is equal to or greater than the control maximum steering angle βmC, the control unit 15 applies a steering limit reaction torque Ts1 to the steering input mechanism 10 to prevent the steering input mechanism 10 from being turned beyond the control maximum steering angle βmC. The steering limit reaction torque Ts1 is a value substantially greater than the normal value of the reaction torque T that could be generated in other situations. The control unit 15 computes a second current value A2 that is required to be supplied to the reaction force actuator 13 to generate the steering limit reaction torque Ts1.

When the steering angle β of the front wheels 3 reaches the control maximum steering angle βmC, the steering limit reaction force torque Ts1 is applied to the steering input mechanism 10. As a result, the driver recognizes that the steered angle α of the front wheels 3 has reached the maximum angle due to the reaction force received from the steering input mechanism 10, and is thereby urged not to turn the steering input mechanism 10 excessively.

As described above, the steering system 1 is provided with a physical stopper 43 that defines the physical maximum steering angle βmP on the left and right sides of the steering shaft 18. Therefore, problems such as damaging wire harness by excessive rotation of the steering shaft 18 can be avoided.

Further, the control unit 15 sets a control maximum steering angle βmC smaller than the physical maximum steering angle βmP, and drives the reaction force actuator 13 so as to generate a steering limit reaction torque Ts1 that defines the control maximum steering angle βmC. When the control unit 15 generates the steering limit reaction torque Ts1, the steering shaft 18 is prevented from colliding with the physical stopper 43. As a result, the generation of collision noise and impact even when the steering wheel 19 is turned excessively. Since the maximum control steering angle βmC of the steering wheel 19 is set on each side of the geometric steering center of the steering wheel 19 (clockwise rotation and counter-clockwise rotation), the maximum steering angle of the steering wheel 19 is evenly distributed to the left and right.

Figure 3:
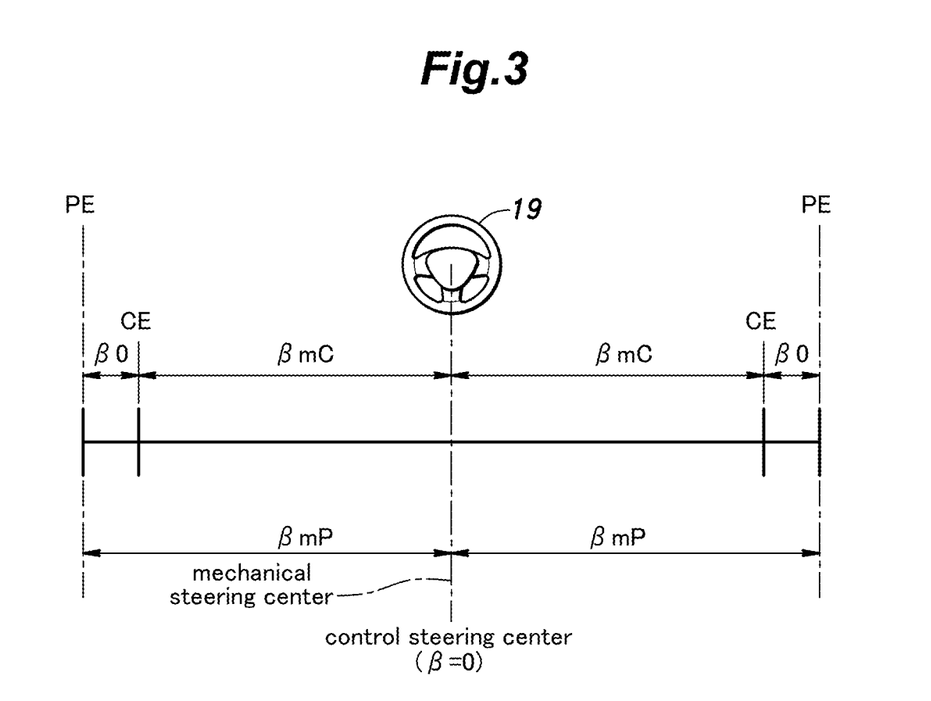
FIG. 3 is a schematic diagram illustrating an example of a relationship between a physical maximum steering angle and a control maximum steering angle when the steering input mechanism is correctly assembled.

FIG. 3 is a diagram showing the relationship between the physical maximum steering angle βmP and the control maximum steering angle βmC as a result of a proper assembly work. As shown in FIG. 3, the steering wheel 19 is assembled to the steering shaft 18 properly so that the geometric steering center of the steering wheel 19 coincides with the mechanical steering center (which is the same as the control steering center in this case) of the steering shaft 18. The steering angle β (angular displacement from the steering center β=0) of the steering shaft 18 detected by the steering angle sensor 21 and the angular displacement of the steering wheel 19 from the geometric steering center as perceived by the drive are in agreement with each other.

However, when assembling the vehicle 2 at the factory, the steering wheel 19 may be assembled to the steering shaft 18 in such a manner that the geometric steering center of the steering wheel 19 is offset from the mechanical steering center of the steering shaft 18. It is also possible that the geometric steering center of the steering wheel 19 may be offset from the mechanical steering center of the steering shaft 18 when the steering wheel 19 is removed from the steering shaft 18 and reassembled during post-factory maintenance.

Figure 4A:
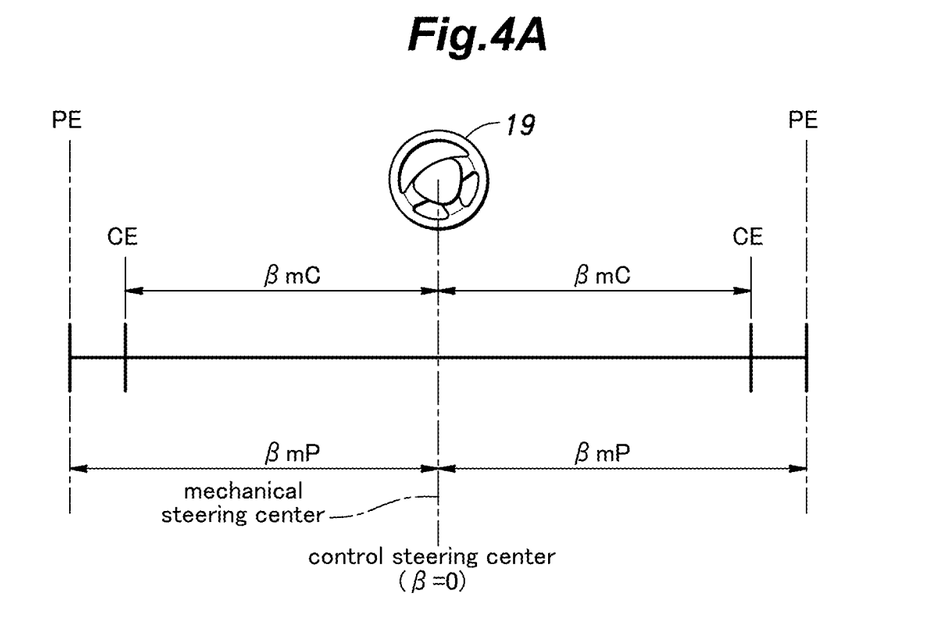
FIG. 4(A) is a diagram showing a condition in which the steering wheel is assembled with a slight angular deviation from the mechanical steering center of the steering shaft.
Figure 4B:
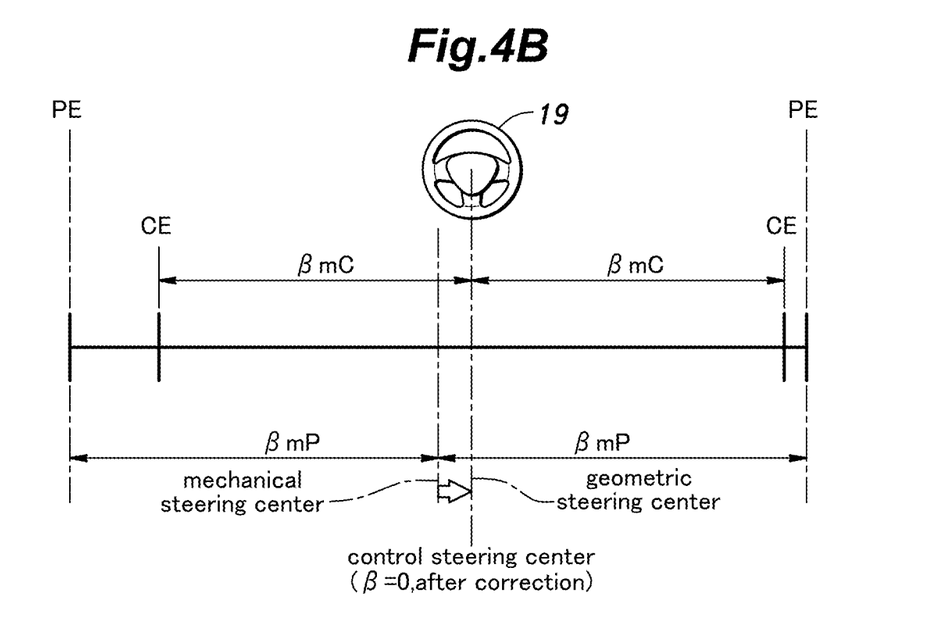
FIG. 4(B) is a diagram showing a condition in which the output of the steering angle sensor is corrected so that the steering angle αt the geometric steering center of the steering wheel coincides with the control steering center.

FIG. 4 is a diagram illustrating the process of correcting the output of the steering angle sensor 21 when a small assembly error was made when installing the steering wheel 19. In this example, as shown in FIG. 4(A), the steering wheel 19 is assembled to the steering shaft 18 such that the steering wheel 19 is turned slightly to the left from the geometric steering center thereof when the steering shaft 18 is at the mechanical steering center. Alternatively, as shown in FIG. 4(B), the steering wheel 19 is assembled to the steering shaft 18 such that the steering wheel 19 is at the geometrical steering center while the steering shaft 18 is slightly turned to the right from the mechanical steering center thereof.

In either case, the person who has performed the assembly work can readily correct the output of the steering angle sensor 21 by operating the control steering center setting switch 37 and inputting the steering center setting signal S to the control unit 15. More specifically, the worker manually operates the control steering center setting switch 37 in a state where the steering wheel 19 is placed at the geometric steering center as shown in FIG. 4(B). When the control steering center setting switch 37 is operated, the steering center setting signal S is generated, and the steering center setting signal S is forwarded to the control unit 15. When the steering center setting signal S is received, the control unit 15 corrects the output of the steering angle sensor 21 so that the current steering angle β is brought to or brought closer to the value corresponding to the control steering center (β=0).

As a result, the worker can correct the output of the steering angle sensor 21 such that the steering angle β at that time is the value corresponding to the control steering center. In other words, even if a setting error should occur when assembling the steering wheel 19, the output of the steering angle sensor 21 can be reset to the value corresponding to the mechanical steering center while the steering wheel 19 is held at the geometrical steering center thereof without requiring the steering wheel 19 to be reassembled. Therefore, the work efficiency in assembling the steering system 1 can be improved. Further, since no physical positioning mechanism is required for the steering system 1, an increase in size and cost of the steering system 1 can be avoided.

The control steering center setting switch 37 may be a switch provided on the vehicle 2 as described above. By providing the control steering center setting switch 37 in the vehicle 2, the worker can easily correct the output of the steering angle sensor 21 by operating the control steering center setting switch 37.

Alternatively, the control steering center setting switch 37 may be a switch provided in the vehicle diagnosis device 39 that is separate from the vehicle 2 as mentioned above. In this case, when the worker operates the control steering center setting switch 37 of the vehicle diagnosis device 39, the vehicle diagnosis device 39 generates the steering center setting signal S, and the steering center setting signal S is forwarded from the vehicle diagnosis device 39 to the control unit 15. Since the steering center setting signal S is an input from the vehicle diagnosis device 39 selectively connected to the vehicle 2, the user of the vehicle or the driver is prevented from erroneously correcting the output of the steering angle sensor 21, for instance, when the vehicle 2 is traveling.

When correcting or calibrating the output of the steering angle sensor 21, the control unit 15 may correct the output of the steering angle sensor 21 such that the current steering angle corresponds to the mechanical steering center after elapsing of a prescribed time period from the time point of receiving the steering center setting signal S. Further, the control unit 15 may temporarily stop driving the reaction force actuator 13 until the prescribed time period has elapsed from the time point of receiving the steering center setting signal S.

As a result, during the calibration of the control steering center, the steering wheel 19 is prevented from being turned by the reaction force which may be generated by the reaction force actuator 13 according to the steering state of the front wheels 3 under the control of the control unit 15. Therefore, the worker can correct the output of the steering angle sensor 21 such that the current steering angle corresponds to the control steering center while the steering wheel 19 is held at the geometric steering center without the fear of the reaction force disturbing this calibration process.

Alternatively, the control unit 15 may correct the output of the steering angle sensor 21 when a predetermined time has elapsed from the time when the prescribed input is received, and temporarily reduce the target reaction torque Tt from the time when the predetermined input is received until the predetermined time has elapsed.

Further, the control unit 15 may set a dead zone in the deviation $\Delta\alpha$ between the target steered angle $\alpha t$ and the steered angle $\alpha$ that is used for setting the target reaction torque Tt from the time when the prescribed input is received until the predetermined time has elapsed.

In either case, during the calibration of the control steering center, the steering wheel 19 is prevented from being turned by the reaction force actuator which may turn the steering wheel according to the steered state of the wheels under the control of the control unit 15. Thereby, the worker is enabled to properly correct the output of the steering angle sensor 21 without being hampered by the reaction force so that the geometrical steering center of the steering wheel coincides with the mechanical steering center of the steering shaft.

Figure 5:
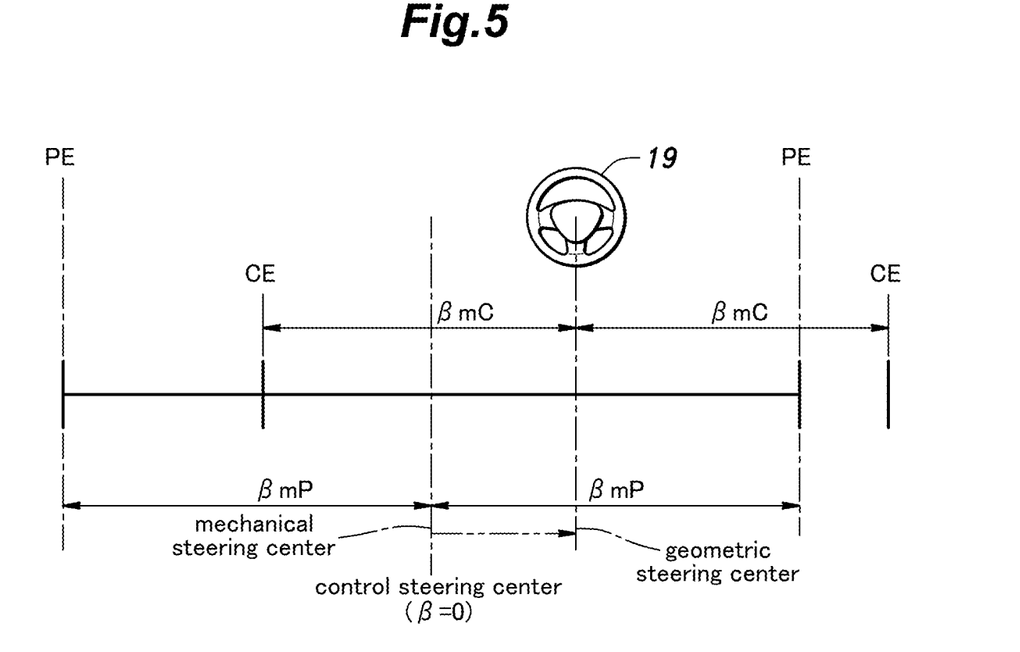
FIG. 5 is a schematic diagram illustrating a first example of output correction of the steering angle sensor in case of a large assembly error.

FIG. 5 is an explanatory diagram of a first example of output correction of the steering angle sensor 21 in the case of a large assembly error. In this example, the steering wheel 19 is assembled to the steering shaft 18 with its geometric steering center significantly angularly deviated to the right from the mechanical steering center of the steering shaft 18 as compared with the case of FIG. 4 (B). In such a case, if the control unit 15 corrects the output of the steering angle sensor 21 so that the current steering angle $\beta$ is a value corresponding to the control steering center, the control maximum steering angle $\beta mC$ exceeds the physical maximum steering angle $\beta mP$. In other words, the control end CE on the corresponding side is more advanced in angle than the corresponding physical end PE. Therefore, in such a case, the control unit 15 prohibits the correction of the output of the steering angle sensor 21.

When the control maximum steering angle $\beta mC$ exceeds the physical maximum steering angle $\beta mP$, the maximum steering angle in one direction becomes smaller than the maximum steering angle in the other direction, and the maximum steering angle becomes uneven between right and left (clockwise and counter-clockwise directions). In the present embodiment, the control unit 15 prohibits the correction of the output of the steering angle sensor 21 to prevent the maximum steering angle from becoming uneven between right and left.

Figure 6A:
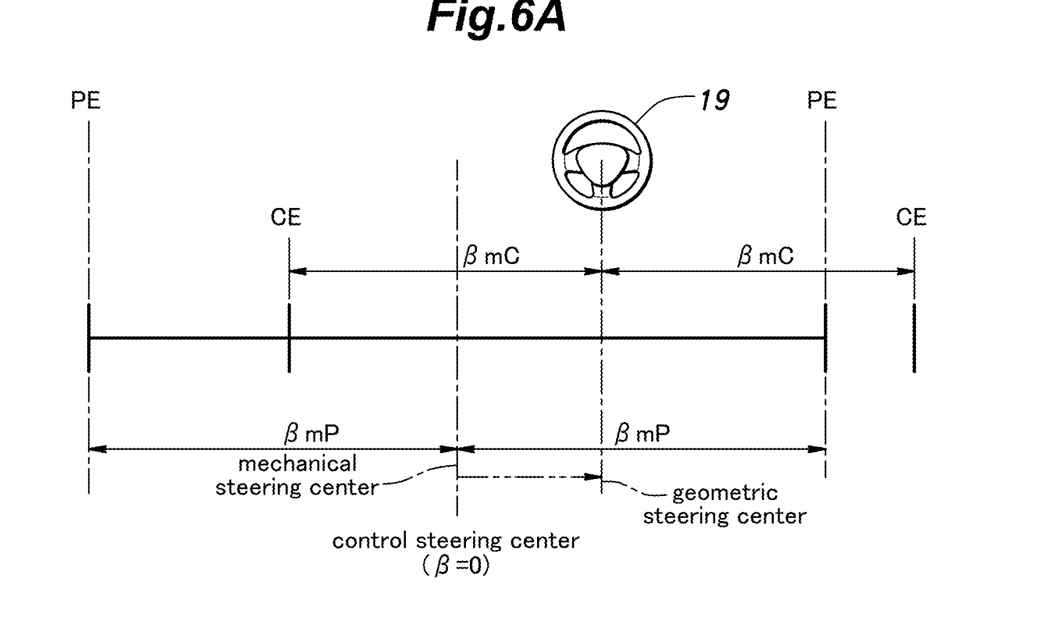
FIG. 6(A) is a diagram showing a condition in which the steering wheel is assembled with a large angular deviation such that correcting the steering angle would cause the control maximum steering angle to exceed the physical maximum steering angle.

FIG. 6 is an explanatory diagram of a second example of output correction of the steering angle sensor 21 in the case of a large assembly error. In this example also, as shown in FIG. 6 (A), the steering wheel 19 is assembled to the steering shaft 18 such that the geometrical steering center of the steering wheel is significantly angularly deviated from the mechanical steering center of the steering shaft 18 to the right. Therefore, when the control unit 15 corrects the output of the steering angle sensor 21 so that the current steering angle $\beta$ is a value corresponding to the control steering center, the control maximum steering angle $\beta mC$ exceeds the physical maximum steering angle $\beta mP$.

Figure 6B:
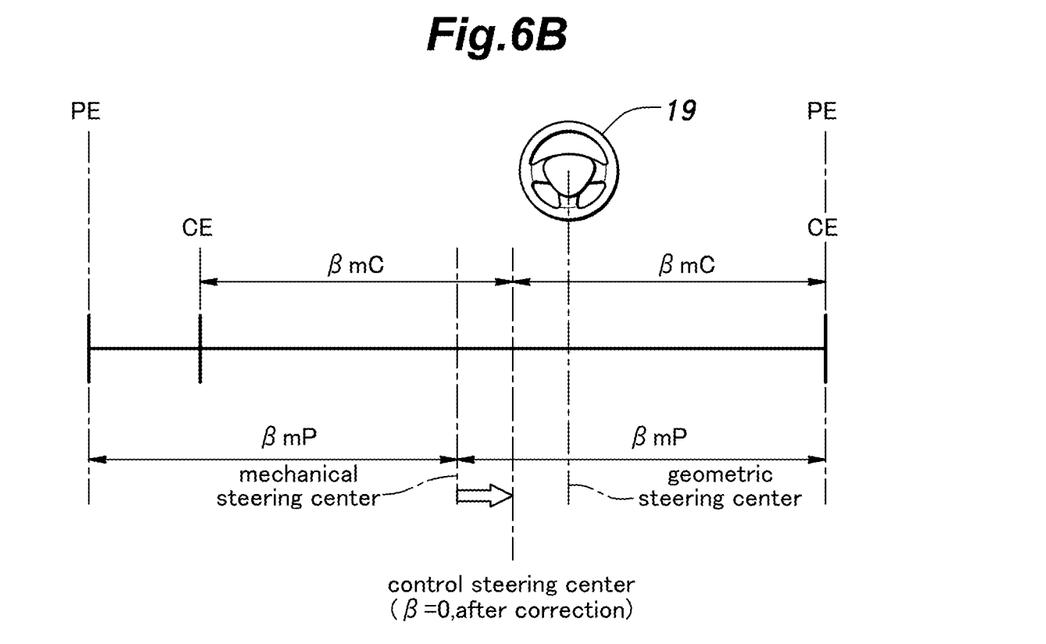
FIG. 6(B) is a diagram showing a condition in which the output of the steering angle sensor is corrected to bring the current steering angle as close as possible to the control steering center without exceeding the physical maximum steering angle.

Therefore, as shown in FIG. 6(B), the control unit 15 corrects the output of the steering angle sensor 21 so that the current steering angle $\beta$ is brought closer to the mechanical steering center as much as possible without causing the control maximum steering angle $\beta mC$ to exceed the physical maximum steering angle $\beta mP$ when the prescribed input is received with the current steering angle set to the geometric steering center. More specifically, the control unit 15 corrects the output of the steering angle sensor 21 so that the right control end CE is equal to or smaller in angle than the right physical end PE.

Thereby, the geometrical steering center of the steering wheel 19 can be brought practically as close to the control steering center as possible without causing the control maximum steering angle $\beta mC$ to exceed the physical maximum steering angle $\beta mP$.

Figure 7A:
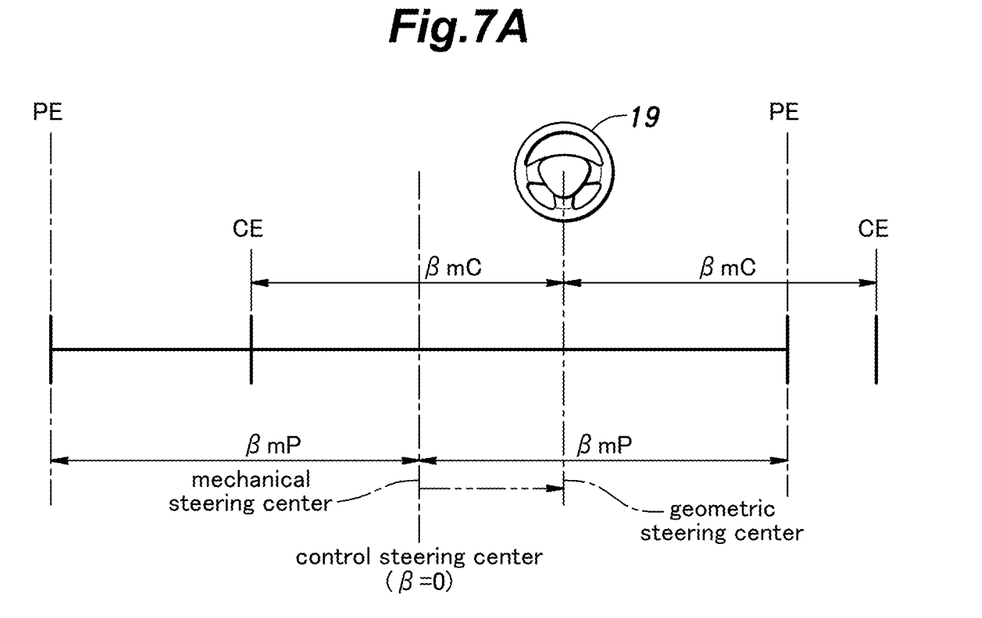
FIG. 7(A) is a diagram showing a condition similar to FIG. 6(A), where the steering wheel is assembled with a large angular deviation from the mechanical steering center.

FIG. 7 is an explanatory diagram of a third example of output correction of the steering angle sensor 21 in the case of a large assembly error. In this example also, as shown in FIG. 7(A), the steering wheel 19 is assembled to the steering shaft 18 such that the geometrical steering center of the steering wheel is significantly angularly deviated from the mechanical steering center of the steering shaft 18 to the right. Therefore, when the control unit 15 corrects the output of the steering angle sensor 21 so that the current steering angle $\beta$ is a value corresponding to the control steering center, the control maximum steering angle $\beta mC$ exceeds the physical maximum steering angle $\beta mP$.

Figure 7B:
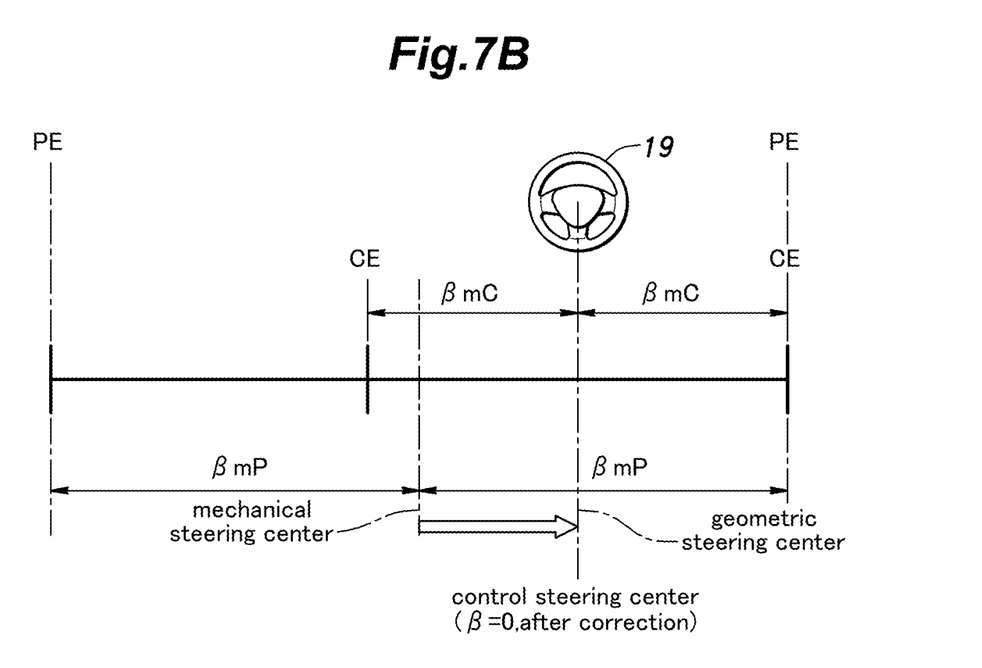
FIG. 7(B) is a diagram showing a condition in which the output of the steering angle sensor is corrected and the ratio of the steering angle to the steered angle is reduced so that the control maximum steering angle does not exceed the physical maximum steering angle.

Therefore, as shown in FIG. 7(B), the control unit 15 sets the current steering angle $\beta$ to a value corresponding to the mechanical steering center ($\beta=0$), and the ratio K of the steering angle $\beta$ with respect to the steered angle $\alpha$ is changed to a smaller value so that the control maximum steering angle $\beta mC$ falls within the physical maximum steering angle $\beta mP$.

As a result, the output of the steering angle sensor 21 is corrected so that the steering angle $\beta$ of the steering shaft 18 is at the control steering center when the steering wheel is placed at the geometric steering center. Further, the control unit 15 changes the ratio K so that the maximum control angle $\beta mC$ is within the physical maximum steering angle $\beta mP$ so that the maximum steered angle of the front wheels 3 is maintained, and the maximum steering angle is prevented from becoming uneven between the left and the right.

The present invention has been described in terms of specific embodiments, but is not limited by such embodiments, and can be modified in various ways without departing from the scope of the present invention. For example, the physical stopper 43 may be provided so that the steering shaft 18 can rotate over an angular range larger than 360 degrees. In this case, the physical stopper 43 may be provided so as to selectively protrude into the receiving groove 42. Alternatively, the physical stopper 43 may be eliminated so that the steering shaft 18 may be rotatable without limitation. In this case, since the physical end PE does not exist, it is not necessary to limit the correction as described with reference to FIGS. 5 to 7. Further, the control unit 15 may set the steering angle sensor 21 so that the average value of the steering angle β (which may be suitably weighted) during the prescribed time period starting from the time point of inputting the steering center setting signal S is set as the value corresponding to the mechanical steering center.

Also, the specific configuration, arrangement, quantity, angle, procedure, and the like of each member and part can be appropriately changed without deviating from the gist of the present invention. Further, all of the components shown in the above embodiments are not necessarily essential to the present invention, and can be appropriately selected and omitted without departing from the gist of the present invention.

REFERENCE NUMERALS

1: steering system
2: vehicle
3: front wheel
10: steering input mechanism
11: steering mechanism
12: steering actuator
13: reaction force actuator
15: control unit
18: steering shaft
19: steering wheel
20: steering column
21: steering angle sensor
32: steered angle sensor
37: control steering center setting switch
39: vehicle diagnosis device
43: physical stopper
α: steered angle
αt: target steered angle
β: steering angle
βmP: physical maximum steering angle
βmC: control maximum steering angle
T: reaction torque
Ts1: steering limit reaction torque
Tt: target reaction torque

The invention claimed is:

1. A steering system for a vehicle, comprising:
a steering wheel configured to be operated by a driver;
a steering shaft connected to the steering wheel in a rotational movement transmitting manner;
a steering mechanism mechanically separated from the steering shaft, and configured to steer wheels of the vehicle;
a steering angle sensor that detects a steering angle about a control steering center given as an angular position of the steering shaft corresponding to a straight traveling state of the vehicle;
a steering actuator that provides a driving force to the steering mechanism;
a steered angle sensor that detects a steered angle of the wheels;
a reaction force actuator that applies a reaction force to the steering wheel in response to a steering operation; and
a control unit configured to determine a target steered angle according to the steering angle and drive the steering actuator so as to cause the steered angle to coincide with the target steered angle, and to determine a target reaction force according to a steered state of the wheels and drive the reaction force actuator so as to cause the reaction force to coincide with the target reaction force,
wherein the control unit is configured to correct an output of the steering angle sensor in such a manner that the current steering angle corresponds to the control steering center when a prescribed input is received, and
wherein the control unit is configured to correct the output of the steering angle sensor when a predetermined time period has elapsed from a time point when the prescribed input is received, and temporarily stop driving the reaction force actuator until the predetermined time period has elapsed from the time point when the prescribed input is received.

2. A steering system for a vehicle, comprising:
a steering wheel configured to be operated by a driver;
a steering shaft connected to the steering wheel in a rotational movement transmitting manner;
a steering mechanism mechanically separated from the steering shaft, and configured to steer wheels of the vehicle;
a steering angle sensor that detects a steering angle about a control steering center given as an angular position of the steering shaft corresponding to a straight traveling state of the vehicle;
a steering actuator that provides a driving force to the steering mechanism;
a steered angle sensor that detects a steered angle of the wheels;
a reaction force actuator that applies a reaction force to the steering wheel in response to a steering operation; and
a control unit configured to determine a target steered angle according to the steering angle and drive the steering actuator so as to cause the steered angle to coincide with the target steered angle, and to determine a target reaction force according to a steered state of the wheels and drive the reaction force actuator so as to cause the reaction force to coincide with the target reaction force,
wherein the control unit is configured to correct an output of the steering angle sensor in such a manner that the current steering angle corresponds to the control steering center when a prescribed input is received, and
wherein the control unit is configured to correct the output of the steering angle sensor when a predetermined time period has elapsed from a time point when the prescribed input is received, and temporarily reduce the target reaction force until the predetermined time period has elapsed from the time point when the prescribed input is received.

3. The steering system for a vehicle according to claim 1, wherein the control unit is configured to determine the target reaction force according to a deviation between the target steered angle and the steered angle, correct the output of the steering angle sensor when a predetermined time period has elapsed from a time point when the prescribed input is received, and provide a dead zone in the deviation between the target steered angle and the steered angle until the predetermined time period has elapsed from the time point when the prescribed input is received.

4. The steering system for a vehicle according to claim 1, further comprising a physical stopper that defines a physical maximum steering angle of the steering shaft in each rotational direction, wherein the control unit is configured to define a control maximum steering angle of the steering wheel in each rotational direction from the control steering center, the control maximum steering angle being smaller than the physical maximum steering angle, and drive the reaction force actuator so as to generate a steering limit reaction force when the steering angle reaches the control maximum steering angle, thereby allowing the driver to recognize that the control maximum steering angle has been reached due to the reaction force received from the steering wheel.

5. A steering system for a vehicle, comprising:
a steering wheel configured to be operated by a driver;
a steering shaft connected to the steering wheel in a rotational movement transmitting manner;
a steering mechanism mechanically separated from the steering shaft, and configured to steer wheels of the vehicle;
a steering angle sensor that detects a steering angle about a control steering center given as an angular position of the steering shaft corresponding to a straight traveling state of the vehicle;
a steering actuator that provides a driving force to the steering mechanism;
a steered angle sensor that detects a steered angle of the wheels;
a reaction force actuator that applies a reaction force to the steering wheel in response to a steering operation;
a physical stopper that defines a physical maximum steering angle of the steering shaft in each rotational direction; and
a control unit configured to determine a target steered angle according to the steering angle and drive the steering actuator so as to cause the steered angle to coincide with the target steered angle, and to determine a target reaction force according to a steered state of the wheels and drive the reaction force actuator so as to cause the reaction force to coincide with the target reaction force,
wherein the control unit is configured to correct an output of the steering angle sensor in such a manner that the current steering angle corresponds to the control steering center when a prescribed input is received,
wherein the control unit is configured to define a control maximum steering angle of the steering wheel in each rotational direction from the control steering center, the control maximum steering angle being smaller than the physical maximum steering angle, and drive the reaction force actuator so as to generate a steering limit reaction force when the steering angle reaches the control maximum steering angle, thereby allowing the driver to recognize that the control maximum steering angle has been reached due to the reaction force received from the steering wheel, and
wherein the control unit prohibits correction of the output of the steering angle sensor when the prescribed input is received with the steering wheel set to a geometrical steering center thereof, and it is determined that the control maximum steering angle will exceed the physical maximum steering angle.

6. The steering system for a vehicle according to claim 4, wherein the control unit corrects the output of the steering angle sensor so that the current steering angle is brought closer to the control steering center as much as possible without causing the control maximum steering angle to exceed the physical maximum steering angle when the prescribed input is received with the steering wheel set to a geometrical steering center thereof, and it is determined that the control maximum steering angle will exceed the physical maximum steering angle.

7. The steering system for a vehicle according to claim 4, wherein the control unit corrects the output of the steering angle sensor so that a geometrical steering center of the steering wheel coincides with the control steering center of the steering shaft, and changes a ratio ($K=\beta/\alpha$) of the steering angle ($\beta$) to the steered angle ($\alpha$) to a smaller value so that the control maximum steering angle does not exceed the physical maximum steering angle when the prescribed input is received with the steering wheel set to a geometrical steering center thereof, and it is determined that the control maximum steering angle will exceed the physical maximum steering angle.

8. The steering system for a vehicle according to claim 1, further comprising a control steering center setting switch provided in the vehicle for generating the prescribed input.

9. The steering system for a vehicle according to claim 2, wherein the prescribed input is an input from a vehicle diagnosis device detachably connected to the vehicle.

10. The steering system for a vehicle according to claim 1, wherein the control unit is configured to correct the output of the steering angle sensor when a predetermined time period has elapsed from a time point when the prescribed input is received, and temporarily reduce the target reaction force until the predetermined time period has elapsed from the time point when the prescribed input is received.

11. The steering system for a vehicle according to claim 5, wherein the control unit corrects the output of the steering angle sensor so that the current steering angle is brought closer to the control steering center as much as possible without causing the control maximum steering angle to exceed the physical maximum steering angle when the prescribed input is received with the steering wheel set to a geometrical steering center thereof, and it is determined that the control maximum steering angle will exceed the physical maximum steering angle.

12. The steering system for a vehicle according to claim 5, wherein the control unit corrects the output of the steering angle sensor so that a geometrical steering center of the steering wheel coincides with the control steering center of the steering shaft, and change a ratio ($K=\beta/\alpha$) of the steering angle ($\beta$) to the steered angle ($\alpha$) to a smaller value so that the control maximum steering angle does not exceed the physical maximum steering angle when the prescribed input is received with the steering wheel set to a geometrical steering center thereof, and it is determined that the control maximum steering angle will exceed the physical maximum steering angle.

13. The steering system for a vehicle according to claim 2, further comprising a control steering center setting switch provided in the vehicle for generating the prescribed input.

14. The steering system for a vehicle according to claim 5, further comprising a control steering center setting switch provided in the vehicle for generating the prescribed input.

15. The steering system for a vehicle according to claim 2, wherein the prescribed input is an input from a vehicle diagnosis device detachably connected to the vehicle.

16. The steering system for a vehicle according to claim 5, wherein the prescribed input is an input from a vehicle diagnosis device detachably connected to the vehicle.

* * * * *